(12) United States Patent
Noguchi

(10) Patent No.: US 9,959,456 B2
(45) Date of Patent: May 1, 2018

(54) IMAGE SEARCH SERVER, IMAGE SEARCH APPARATUS, AND METHOD OF CONTROLLING OPERATION OF SAME

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/715,223

(22) Filed: Sep. 26, 2017

(65) Prior Publication Data

US 2018/0018506 A1 Jan. 18, 2018

Related U.S. Application Data

(60) Division of application No. 14/867,480, filed on Sep. 28, 2015, now Pat. No. 9,805,253, which is a
(Continued)

(30) Foreign Application Priority Data

Mar. 28, 2013 (JP) .................................. 2013-068199

(51) Int. Cl.
  *G06K 9/00* (2006.01)
  *G06F 17/30* (2006.01)
  *G06T 11/60* (2006.01)

(52) U.S. Cl.
  CPC ... *G06K 9/00268* (2013.01); *G06F 17/30247* (2013.01); *G06F 17/30256* (2013.01); *G06F 17/30265* (2013.01); *G06T 11/60* (2013.01)

(58) Field of Classification Search
  CPC ......... G06F 17/30247; G06F 17/30256; G06F 17/30265; G06K 9/00268; G06T 11/60
  See application file for complete search history.

(56) References Cited

U.S. PATENT DOCUMENTS 6,845,371 B1  1/2005 Lee
8,515,212 B1  8/2013 Bengio
(Continued)

FOREIGN PATENT DOCUMENTS

JP  09-101970  4/1997
JP  2000-132554  5/2000
(Continued)

OTHER PUBLICATIONS

International Search Report, PCT/JP2014/055961, dated Jun. 3, 2014.
(Continued)

*Primary Examiner* — Edward Park
(74) *Attorney, Agent, or Firm* — Young & Thompson

(57) ABSTRACT

An image search server constituting an image search system having a client computer and the image search server includes at least one hardware processor configured to calculate, with regard to each image of a multiplicity of images, the values of feature quantities representing characteristics of the image, score the image based upon the calculated values of the feature quantities, and responsive to application of a first move command which moves one image among a plurality of images displayed in a candidate area, which has been formed on a display screen of said client computer, to a search result area, raise the value of feature quantities, which correspond to the feature quantities of the one image for which the first move command has been applied, and score said multiplicity of images based upon the raised values of the feature quantities.

10 Claims, 21 Drawing Sheets

Related U.S. Application Data continuation of application No. PCT/JP2014/055961, filed on Mar. 7, 2014.

(56) References Cited

U.S. PATENT DOCUMENTS

| | | | |
|---|---|---|---|
| 2008/0082426 A1 | 4/2008 | Gokturk | |
| 2012/0056893 A1 | 3/2012 | Nakajima | |
| 2014/0218391 A1* | 8/2014 | McConnell | G06F 3/04817 |
| | | | 345/619 |
| 2014/0281847 A1* | 9/2014 | Marra | G06F 17/212 |
| | | | 715/202 |

FOREIGN PATENT DOCUMENTS

| | | |
|---|---|---|
| JP | 2004-259061 | 9/2004 |
| JP | 2007-072823 | 3/2007 |
| JP | 2010-068225 | 3/2010 |
| JP | 2011-103135 | 5/2011 |
| JP | 2012-058940 | 3/2012 |

OTHER PUBLICATIONS

Written Opinion, PCT/JP2014/055961, dated Jun. 3, 2014.
Chinese Official Action—201480017106.0—dated Oct. 31, 2017.

* cited by examiner

IMAGE FEATURE QUANTITY TABLE: G2

| IMAGE  FEATURE QUANTITY | I101 | I102 | I103 | ...... | I213 |
|---|---|---|---|---|---|
| BLURRINESS | u101 | u102 | u103 | ...... | u213 |
| BRIGHTNESS | b101 | b102 | b103 | ...... | b213 |
| COMPOSITION | a101 | a102 | a103 | ...... | a213 |
| ⋮ | ⋮ | ⋮ | ⋮ | ⋮ | ⋮ |

*Fig. 7*

FEATURE QUANTITY WEIGHTING COEFFICIENT TABLE

| FEATURE QUANTITY | WEIGHTING COEFFICIENTS | | | |
|---|---|---|---|---|
| | INITIAL VALUE | AFTER FIRST OPERATION | AFTER SECOND OPERATION | |
| BLURRINESS | k | k1 | | |
| BRIGHTNESS | k | k2 | | |
| COMPOSITION | k | k3 | | |
| ⋮ | ⋮ | ⋮ | | |

*Fig. 8*

UNVIEWED PAGE LIST

| UNVIEWED PAGE | 1, 2+3, 4+5, 6+7, ············ 20+21 |
|---|---|

*Fig. 9*

IMAGE SCORE: G2

| IMAGE | I101 | I102 | I103 | ………… | I213 |
|-------|------|------|------|------|------|
| SCORE | P101 | P102 | P103 | ………… | P213 | de# IMAGE SEARCH SERVER, IMAGE SEARCH APPARATUS, AND METHOD OF CONTROLLING OPERATION OF SAME

CROSS-REFERENCE TO RELATED APPLICATIONS

This application is a Continuation of PCT International Application No. PCT JP2014/055961 filed on Mar. 7, 2014, which claims priority under 35 U.S.C. § 119(a) to Japanese Patent Application No. 2013-068199 filed Mar. 28, 2013. Each of the above application(s) is hereby expressly incorporated by reference, in its entirety, into the present application.

BACKGROUND OF THE INVENTION

Field of the Invention

This invention relates to an image search apparatus, a method of controlling the operation thereof, and an image search server.

Description of the Related Art

Japanese Patent Application Laid-Open No. 2011-103135 describes a system in which, when an electronic album is created, images to be placed in a layout frame provided in a template are selected automatically and the selected images are then placed in the layout frame.

According to the description set forth in Japanese Patent Application Laid-Open No. 2011-103135, the system is such that when an automatically created album is revised, desired images are re-selected from among a large number of images. This makes it difficult for the user to find images in line with user preference.

SUMMARY OF THE INVENTION

The present invention provides an image search apparatus, an image search server, and a method of controlling operation of an image search apparatus in which an image in line with user preference is found comparatively simply.

An image search apparatus according to a first aspect of the present invention includes: a display control device (display control means) for controlling a display unit so as to display a plurality of images in a candidate area of a display screen; a feature quantity calculation device (feature quantity calculation means) for calculating, with regard to each image of a multiplicity of images, the values of feature quantities representing characteristics of the image; a scoring device (scoring means) for scoring the image based upon the values of the feature quantities calculated by the feature quantity calculation device; a first scoring control device (first scoring control means), responsive to application of a first move command which moves an image being displayed in the candidate area to a search result area, for controlling the scoring device so as to raise the value of feature quantities, which correspond to the feature quantities of the image for which the first move command has been applied, and score the multiplicity of images based upon the raised values of the feature quantities; and an image placement decision device (image placement decision means) for deciding image placement in such a manner that a predetermined number of images having high scores obtained by the scoring device are displayed in the search result area of the display screen, and images other than the predetermined number of images are displayed in the candidate area of the display screen.

The first aspect of the present invention provides also an operation control method suited to an image search apparatus. Specifically, the method includes steps of: controlling a display unit so as to display a plurality of images in a candidate area of a display screen; calculating, with regard to each image of a multiplicity of images, the values of feature quantities representing characteristics of the image; scoring the image based upon the calculated values of the feature quantities; in response to application of a first move command which moves an image being displayed in the candidate area to a search result area, raising the value of feature quantities, which correspond to the feature quantities of the image for which the first move command has been applied, and scoring the multiplicity of images based upon the raised values of the feature quantities; and deciding image placement in such a manner that a predetermined number of images having high scores obtained by scoring are displayed in the search result area of the display screen, and images other than the predetermined number of images are displayed in the candidate area of the display screen. It may be arranged so as to create an electronic album using images that are being displayed in the search result area.

The first aspect of the present invention provides also a recording medium storing a program for controlling a computer of an image search apparatus.

In accordance with the present invention, a plurality of images are displayed in a candidate area of a display screen. With regard to each image of a multiplicity of images, the values of feature quantities representing the characteristics of the image are calculated and the image is scored based upon the calculated values of the feature quantities. If an image being displayed in the candidate area is moved to a search result area, the value of feature quantities, which correspond to the feature quantities of the image for which the first move command has been applied, are raised, and the images are scored based upon the raised values of the feature quantities. Image placement is decided in such a manner that a predetermined number of images having high scores are displayed in the search result area of the display screen while images other than the predetermined number of images are displayed in the candidate area of the display screen. An image that is moved to the search result area is construed to be an image in line with user preference, and images having feature quantities the same as those of this image are displayed in the search result area. As a result, images in line with user preference are displayed in the search result area.

By way of example, the display control device, in response to application of an image display command to display images in the placement decided by the image placement decision device, controls the display unit so as to display images in the decided placement.

The display control device may control the display unit so as to display a deletion area, in addition to the candidate area, on the display screen. In this case, it is preferred that the apparatus further includes a second scoring control device (second scoring control means), responsive to application of a second move command which moves an image being displayed in the candidate area or an image being displayed in the search result area to the deletion area, for controlling the scoring device so as to lower the value of feature quantities, which correspond to the feature quantities of the image for which the second move command has been applied, and score the multiplicity of images based upon the lowered values of feature quantities.

By way of example, the first scoring control device, in response to application of a third move command which moves an image, which is being displayed in the search result area in accordance with the first move command, to the candidate area, controls the scoring device so as to score the images upon restoring raised values of the feature quantities to their original values. By way of example, the second scoring control device, in response to application of a third move command which moves an image, which is being displayed in the search result area in accordance with the second move command, to the candidate area, controls the scoring device so as to score the images upon restoring lowered values of the feature quantities to their original values.

The apparatus may further includes an electronic album creation device (electronic album creation means) for creating an electronic album using images being displayed in the search result area by the image placement decision device.

A second aspect of the present invention provides an image search server constituting an image search system having a client computer and the image search server, including: a feature quantity calculation device (feature quantity calculation means) for calculating, with regard to each of a multiplicity of images, the values of feature quantities representing characteristics of the image; a scoring device (scoring means) for scoring the image based upon the values of the feature quantities calculated by the feature quantity calculation device; and a first scoring control device (first scoring control means), responsive to application of a first move command which moves one image among a plurality of images being displayed in a candidate area, which has been formed on a display screen of the client computer, to a search result area, for controlling the scoring device so as to raise the value of feature quantities, which correspond to the feature quantities of the one image for which the first move command has been applied, and score the multiplicity of images based upon the raised values of the feature quantities.

The second aspect of the present invention provides also an operation control method suited to an image search server. Specifically, the second aspect of the present invention provides a method of controlling operation of an image search server constituting an image search system having a client computer and the image search server, including steps of: calculating, with regard to each image of a multiplicity of images, the values of feature quantities representing characteristics of the image; scoring the image based upon the calculated values of the feature quantities; and in response to application of a first move command which moves one image among a plurality of images being displayed in a candidate area, which has been formed on a display screen of the client computer, to a search result area, raising the value of feature quantities, which correspond to the feature quantities of the one image for which the first move command has been applied, and scoring the multiplicity of images based upon the raised values of the feature quantities.

In the second aspect of the present invention, images in line with user preference are displayed in the search result area in a manner similar to that of the first aspect of the present invention.

The server may further includes a second scoring control device (second scoring control means), responsive to application of a second move command which moves one image among a plurality of images being displayed in the candidate area, which has been formed on the display screen of the client computer, or one image among a plurality of images being displayed in the search result area, to a deletion area, for controlling the scoring device so as to lower the value of feature quantities, which correspond to the feature quantities of the image for which the second move command has been applied, and score the multiplicity of images based upon the lowered values of feature quantities.

A third aspect of the present invention provides an image search server constituting an image search system having a client computer and the image search server, including: a feature quantity calculation device (feature quantity calculation means) for calculating, with regard to each image of a multiplicity of images, the values of a feature quantities representing characteristics of the image; a scoring device (scoring means) for scoring the image based upon the values of the feature quantities calculated by the feature quantity calculation device; wherein a plurality of images having high scores obtained by the scoring device are displayed in a search result area of a display screen of the client computer and images other than the plurality of images are displayed in a candidate area of the display screen; and a first scoring control device (first scoring control means), responsive to application of a first move command which moves an image being displayed in the candidate area, which has been formed on the display screen of the client computer, to the search result area, for controlling the scoring device so as to raise the value of feature quantities, which correspond to the feature quantities of the image for which the first move command has been applied, and score the multiplicity of images based upon the raised values of the feature quantities.

The third aspect of the present invention provides also an operation control method suited to an image search server. Specifically, the third aspect of the present invention provides a method of controlling operation of an image search server constituting an image search system having a client computer and the image search server, including steps of: calculating, with regard to each image of a multiplicity of images, the values of feature quantities representing characteristics of the image; scoring the image based upon the calculated values of the feature quantities; wherein a plurality of images having high scores obtained by scoring are displayed in a search result area of a display screen of the client computer and images other than the plurality of images are displayed in a candidate area of the display screen; and in response to application of a first move command which moves an image being displayed in the candidate area, which has been formed on the display screen of the client computer, to the search result area, raising the value of feature quantities, which correspond to the feature quantities of the image for which the first move command has been applied, and scoring the multiplicity of images based upon the raised values of the feature quantities.

In the third aspect of the present invention as well, images in line with user preference are displayed in the search result area in a manner similar to that of the first aspect of the present invention.

The server may further includes a second scoring control device (second scoring control means), responsive to application of a second move command which moves an image being displayed in the candidate area, which has been formed on the display screen of the client computer, or an image being displayed in the search result area, to a deletion area, for controlling the scoring device so as to lower the value of feature quantities, which correspond to the feature quantities of the image for which the second move command has been applied, and score the multiplicity of images based upon the raised values of the feature quantities.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is an example of a table of weighting coefficients of feature quantities;

FIG. 8 is an example of a list of unviewed pages;

FIG. 9 illustrates image scoring;

DESCRIPTION OF THE EMBODIMENTS

Figure 1:
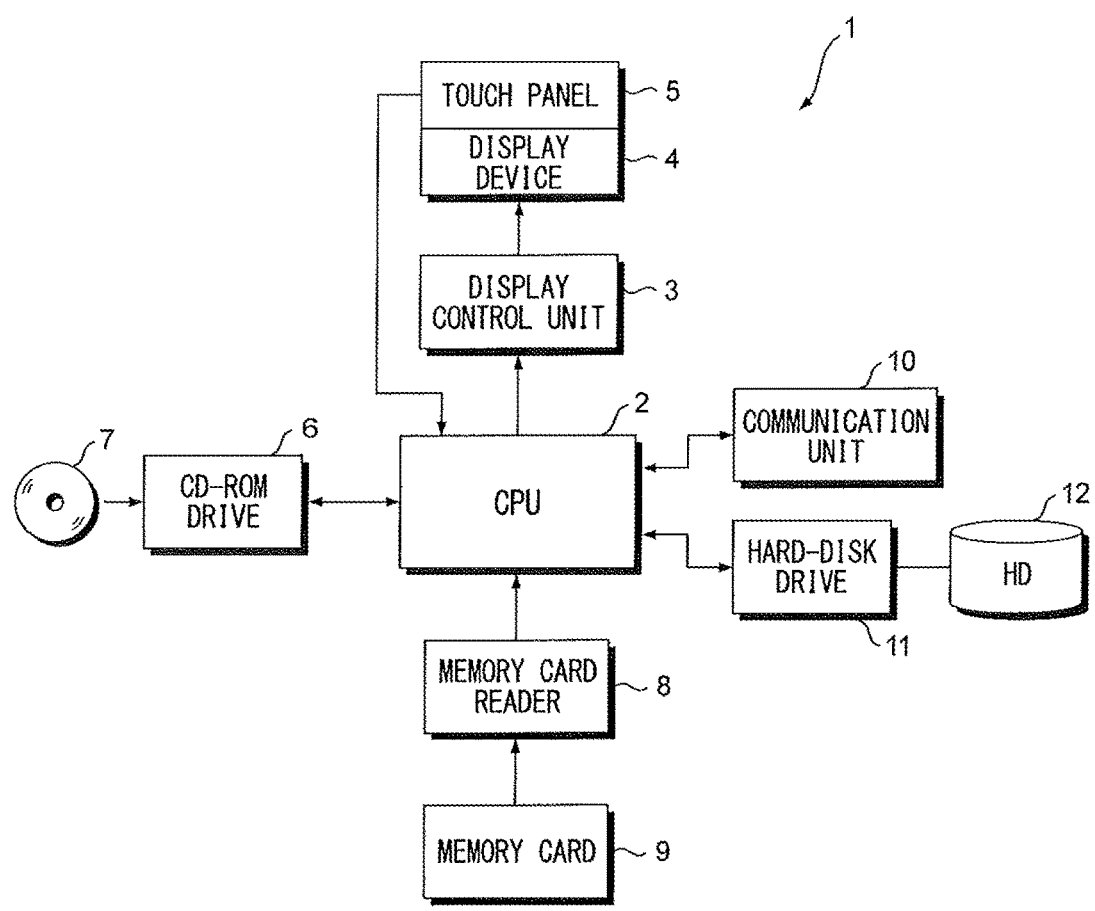
FIG. 1 is a block diagram illustrating the configuration of a photobook creation apparatus.

FIG. 1, which shows an embodiment of the present invention, is a block diagram illustrating the electrical configuration of a photobook (electronic album) creation 1.

The overall operation of the photobook creation apparatus 1 is controlled by a CPU 2.

The photobook creation apparatus 1 includes a CD-ROM (Compact-Disc-Read-Only Memory) drive 6. By loading a CD-ROM 7 containing an operation program, described later, in the CD-ROM drive 6, the operation program is read and installed in the photobook creation apparatus 1. The photobook creation apparatus 1 is provided with a communication unit 10 as well. The operation program may be received by the communication unit 10 and the received operation program installed in the photobook creation apparatus 1.

The photobook creation apparatus 1 includes a display device 4 controlled by a display control unit 3. A touch panel 5 has been formed on the display screen of the display device 4. A signal produced in response to touching of the touch panel 5 is input to the CPU 2. The photobook creation apparatus 1 is further provided with a hard disk 12, which is accessed by a hard-disk drive 11, and a memory card reader 8. When a memory card 9 storing image files representing a large number of images is loaded in the memory card reader 8, the image files are read by the memory card reader 8.

Figure 2:
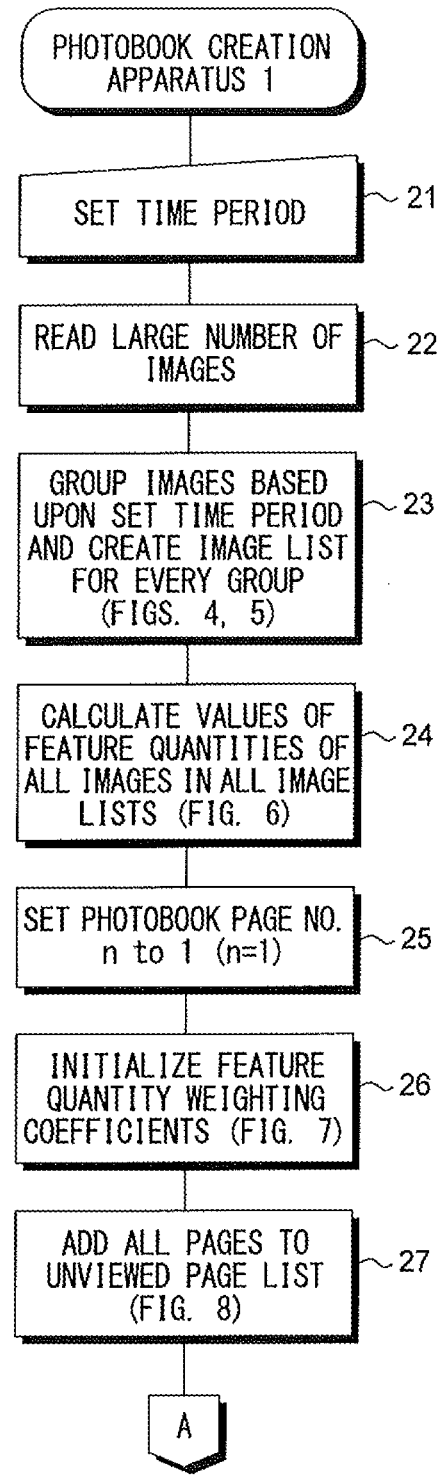
FIGS. 2 and 3 are flowcharts illustrating processing executed by the photobook creation apparatus.
Figure 3:
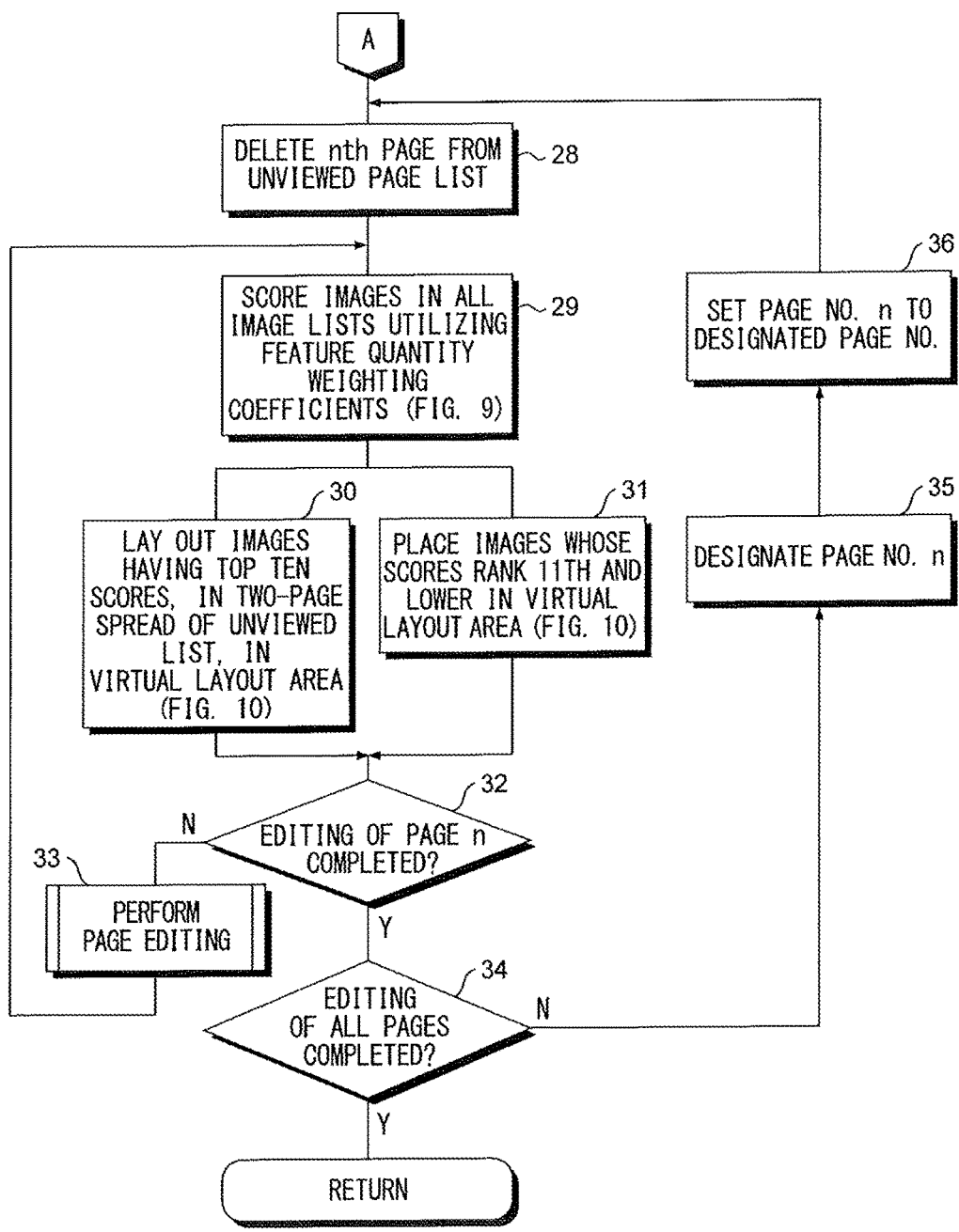

FIGS. 2 and 3 are flowcharts illustrating processing executed by the photobook creation apparatus 1.

The photobook creation apparatus 1 is so adapted that in a case where the photobook creation apparatus 1 according to this embodiment displays the automatically laid-out page of a photobook on a display screen and a user performs an editing operation for changing an image, the photobook creation apparatus 1 refers to the editing operation and arranges it so that images to be laid out on the page of the photobook will be images in line with user preference.

The period of image capture of images to be included in the photobook is designated by the user (step 21). The memory card 9 (which may be some other medium) is loaded in the memory card reader 8 and image files representing a large number of images stored on the memory card 9 are read (step 22). The large number of images represented by the read image files are grouped based upon the date and time of image capture and an image list is formed for every group (step 23).

Figure 4:
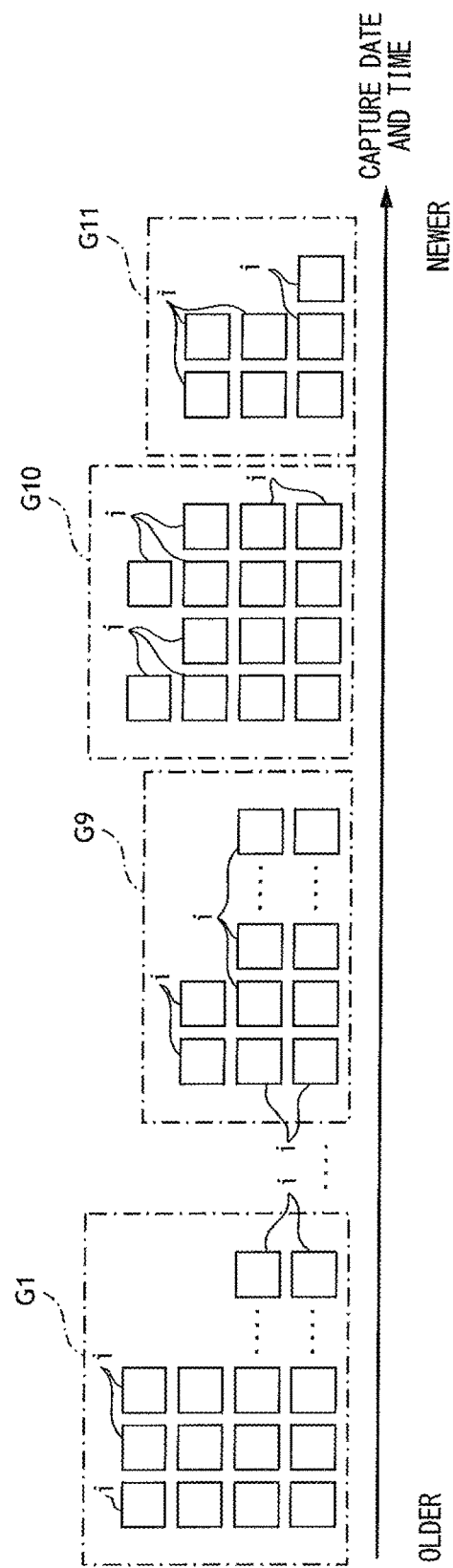
FIG. 4 illustrates how images are grouped.

FIG. 4 illustrates how a large number of read images are grouped.

The horizontal axis in FIG. 4 indicates date and time of image capture. A large number of read images i are arrayed based upon date and time of image capture and are grouped according to image-capture date and times that are close together. In FIG. 4, 11 groups, namely group G1 to group G11, have been created. Although grouping is performed in such a manner that the numbers of images contained in the groups are approximately the same, they need not necessarily be the same. It goes without saying that the date and time of image capture will have been recorded in the header of each image file.

When the images are grouped, an image list is created for every group.

Figures 5, 6:
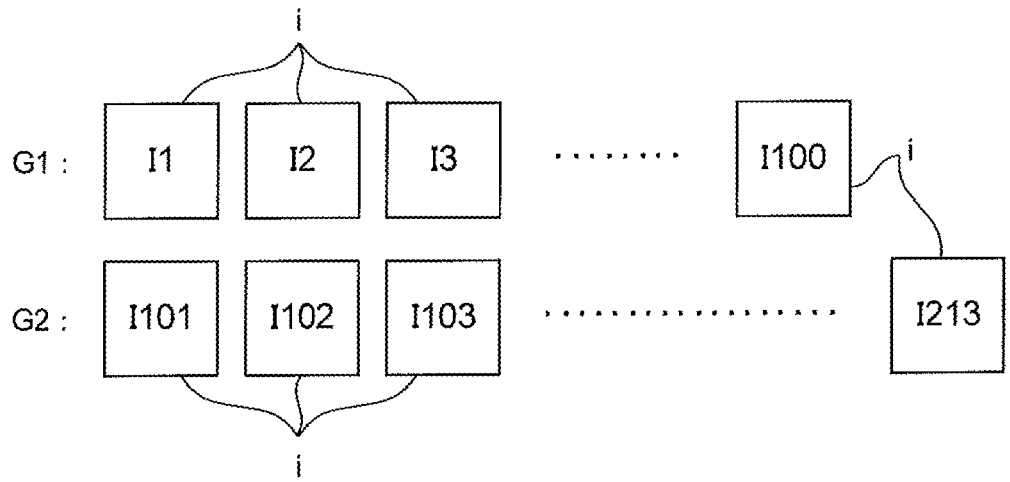
FIG. 5 is an example of image lists.
FIG. 6 is an example of a table of image feature quantities.

FIG. 5 is an example of image lists of the groups G1 and G2.

In group G1, 100 images from images I1 to I100 form this one group and an image list of these images is created. In group G2, 113 images from images I101 to I213 form this one group and an image list of these images is created. Image lists are created in similar fashion for the other groups as well.

With reference again to FIG. 2, values of feature quantities with regard to all images of all image lists are calculated (step 24).

FIG. 6 is an example of a table of image feature quantities regarding group G2.

The image feature quantity table contains values of feature quantities of the images, which are included in the image list, in correspondence with feature quantities (blurriness, brightness, composition, etc.) representing the characteristics of the images. For example, the values of the feature quantities blurriness, brightness and composition of the image I101 are u101, b101 and a101, respectively. Similarly, the values of the feature quantities blurriness, brightness and composition of the image I102 are u102, b102 and a102, respectively. The table similarly contains values of feature quantities regarding the other images I103 to I212 included in group G1.

By calculating the values of the feature quantities of all images in all of the image lists, image feature quantity tables of the above kind are created with regard to all of the groups G1 to G21 obtained by grouping of the images.

Next, a photobook page number n is set (step 25 in FIG. 2). The photobook page number n indicates a page that will be edited by the user, and the page specified by the page number n is displayed on the display screen (see FIG. 12). Further, feature quantity weighting coefficients are initialized (step 26).

FIG. 7 is an example of a table of feature quantity weighting coefficients.

The feature quantity weighting coefficient table contains weighting coefficients in correspondence with feature quantities. The value of a feature quantity (see FIG. 5) is multiplied by the weighting coefficient. As will be described later, the sum total of values of feature quantities of an image multiplied by weighting coefficients is the score of the image.

As will be described later in greater detail, weighting coefficients are changed in accordance with the editing operation performed by the user. For this reason, a history of weighting coefficients that prevail after the performance of editing operations is stored in the feature quantity weighting coefficient table in addition to the initial values of the weighting coefficients. For example, although k is the initial value for each of the feature quantities blurriness, brightness and composition, the weighting coefficients of the feature quantities blurriness, brightness and composition take on the values k1, k2 and k3, respectively, owing to a first-time editing operation.

Next, all pages are added to an unviewed page list (step 27 in FIG. 2).

FIG. 8 is an example of a list of unviewed pages.

The unviewed page list indicates pages of the photobook that have not yet undergone editing by the user. Since even one page will not have been edited by the user in the initial state, all pages of the photobook are entered in the unviewed page list. Further, in this embodiment, a two-page spread of the photobook undergoes editing (although editing need not necessarily be applied to a two-page spread). Accordingly, pairs of pages, excluding the first page, have been added to the unviewed page list.

Next, an nth page is deleted from the unviewed page list (step 28 in FIG. 3). Since n=1 has been set, the first page is deleted from the unviewed page list.

Next, the images in all of the image lists are scored utilizing the feature quantity weighting coefficients (step 29 in FIG. 3).

FIG. 9 is an example of a score table indicating the scores of images belonging to the image list of group G2.

The score table contains the scores in correspondence with the images. The score of an image is the sum total of the values of the image feature quantities obtained by multiplying the feature quantities of the image, which are contained in the image feature quantity table of FIG. 6, by the weighting coefficients of these feature quantities contained in the feature quantity weighting coefficient table of FIG. 7. For example, the value of the blurriness feature quantity, value of the brightness feature quantity and value of the composition feature quantity of image I101 are u101, b101 and a101, respectively, as shown in FIG. 6, and the weighting coefficient of the blurriness feature quantity, weighting coefficient of the brightness feature quantity and weighting coefficient of the composition feature quantity are all k. Therefore, the score P101 of image I101 is calculated as P101=u101×k+b101×k+a101×k . . . . Such scoring is carried out for every image list (every group) with regard to the images belonging to the image lists of all of the groups G1 to G21. Score tables are created with regard to all groups.

In this embodiment, first the photobook creation apparatus 1 performs layout with regard to pages other than page n (page 1 in this case because n=1 has been set) to be edited by the user.

Figure 10:
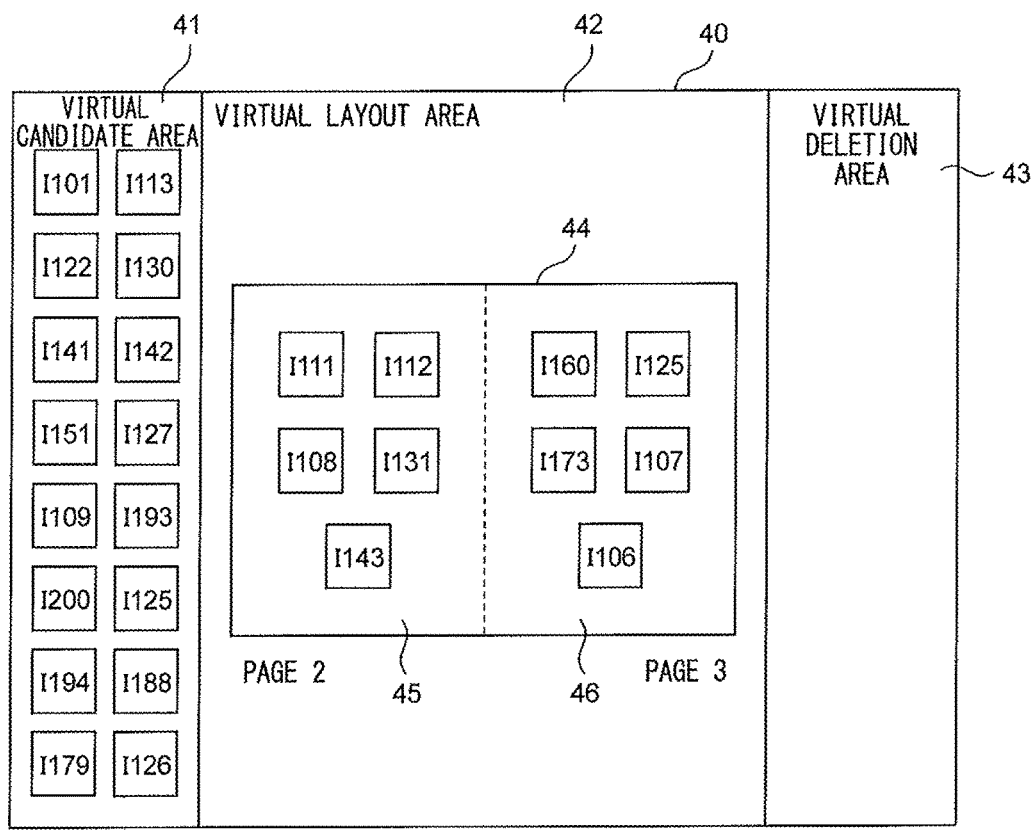
FIG. 10 is an example of a virtual editing image.

FIG. 10 illustrates a virtual editing image 40 of page 2 and page 3 included in an unviewed page list.

The virtual editing image 40 corresponds to an image actually displayed on the display screen of the display device 4 of the photobook creation apparatus 1. The virtual editing image 40 is created within the photobook creation apparatus 1 before it is actually displayed on the display screen. When an edit command regarding the created virtual editing image 40 is applied, the virtual editing image 40 is displayed on the display screen as an image for editing purposes and the user performs a layout change or the like while viewing the displayed image.

The virtual editing image 40 includes a virtual candidate area 41, a virtual layout area 42 (a search result area of the present invention) and a virtual deletion area 43. The virtual layout area 42 is for displaying the layout of pages that constitute the photobook and it includes virtual pages 44 of a two-page spread corresponding to pages of the photobook. Images have been assigned to a left-side virtual page (page 2) 45 and to a right-side virtual page (page 3) 46. These images are those having the top ten high scores from among the images contained in the image list of group G2 corresponding to page 2 and page 3, as mentioned above. Images whose scores rank 11$^{th}$ and lower from among the images contained in the image list of group G2 corresponding to pages 2 and 3 have been assigned to the virtual candidate area 41. The virtual deletion area 43 need not necessarily be utilized.

The image assigning processing shown in FIG. 10 is executed with regard to all pages contained in the unviewed page list.

With reference again to FIG. 3, images having the top ten high scores in the two-page spread of the unviewed page list from among the images belonging to the image list that corresponds to this two-page spread are assigned to (laid out in) the virtual layout area 42 (step 30), and images whose scores rank 11$^{th}$ and lower are assigned to the virtual candidate area 41 (step 31).

If the editing of page n has not been completed ("NO" at step 32), page editing is performed by the user (step 33). If editing of page n has been completed ("YES" at step 32), then a check is made to determine whether the editing of all pages of the photobook has been completed (step 34). If such editing has not been completed ("NO" at step 34), the page number n to be edited next is designated by the user (step 35). Owing to the two-page spread, an even number would be designated. The page number n is set to the designated page number n (step 36) and the processing of the above-described steps 28 to 33 is repeated with regard to the set page number n.

Figure 11:
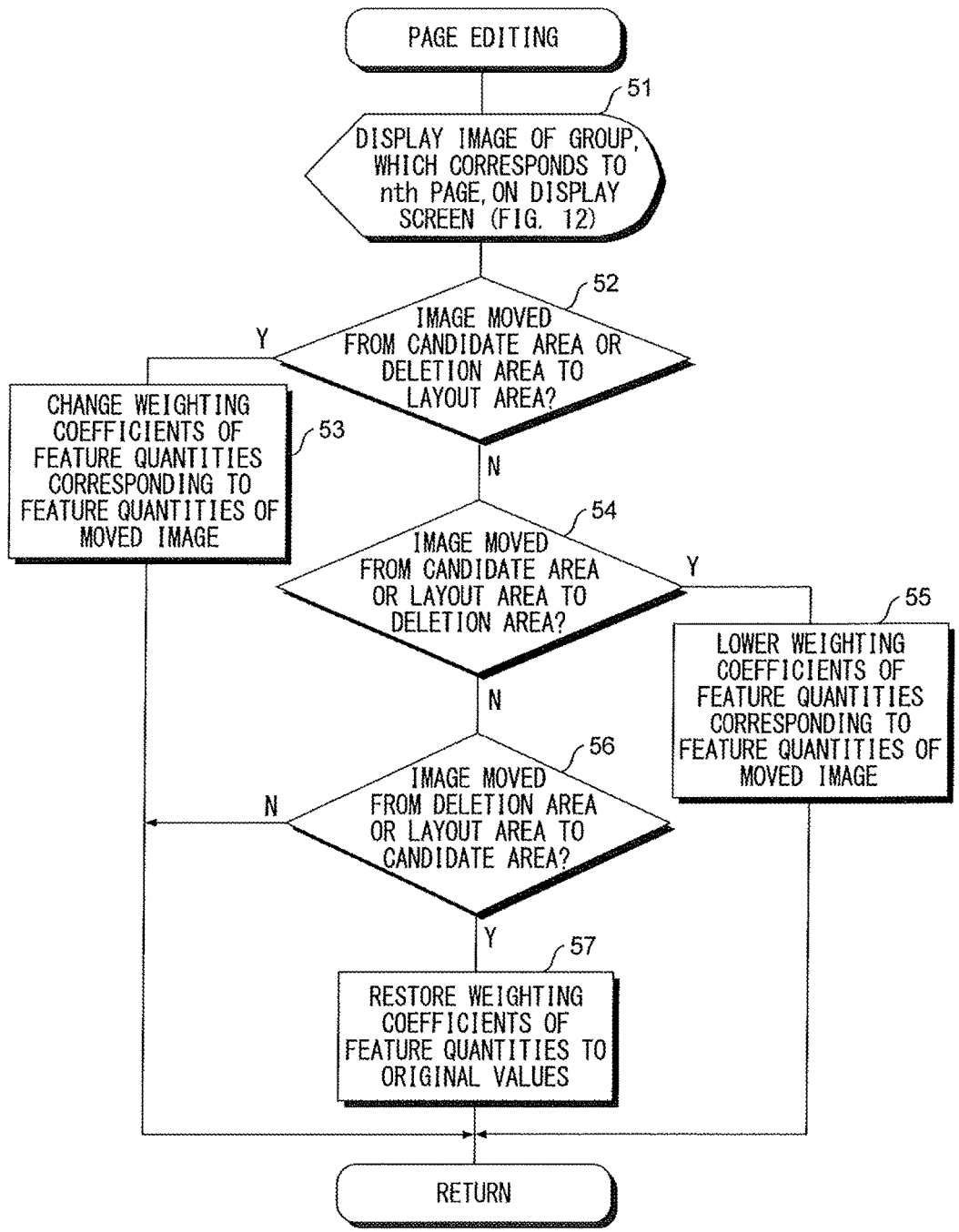
FIG. 11 is a flowchart of page editing processing.
Figure 12:
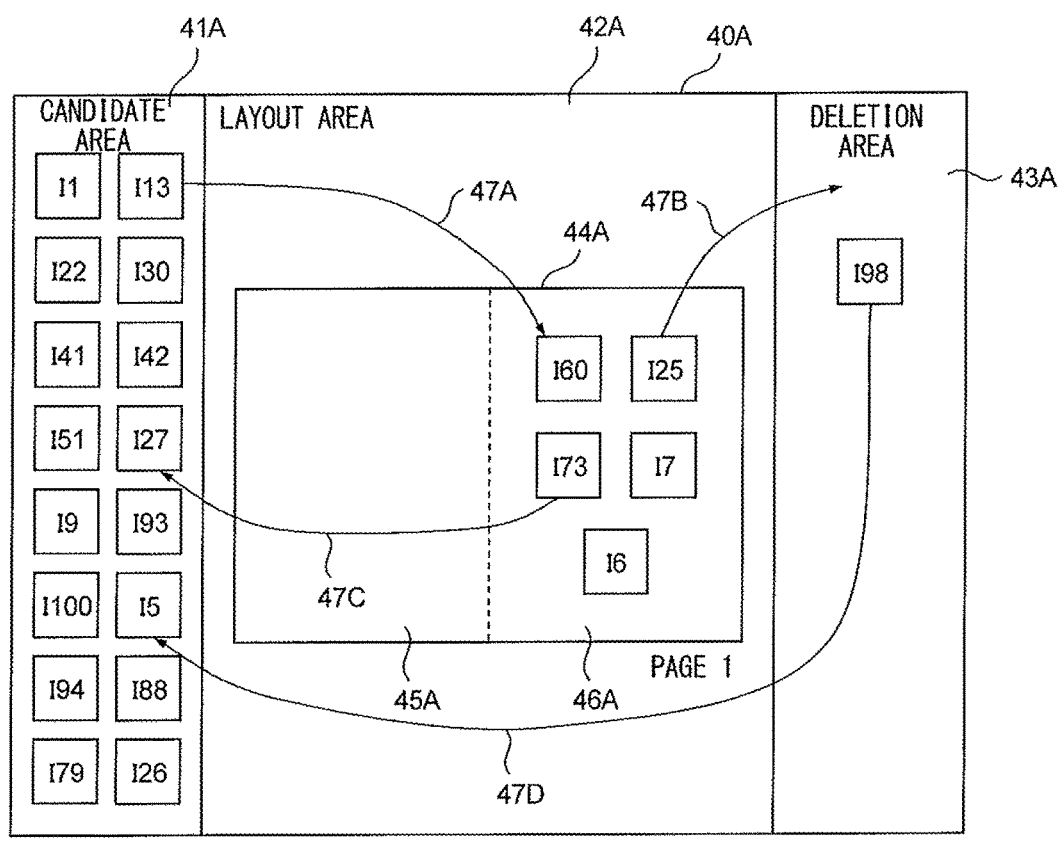
FIG. 12 is an example of an editing image.
Figure 13:
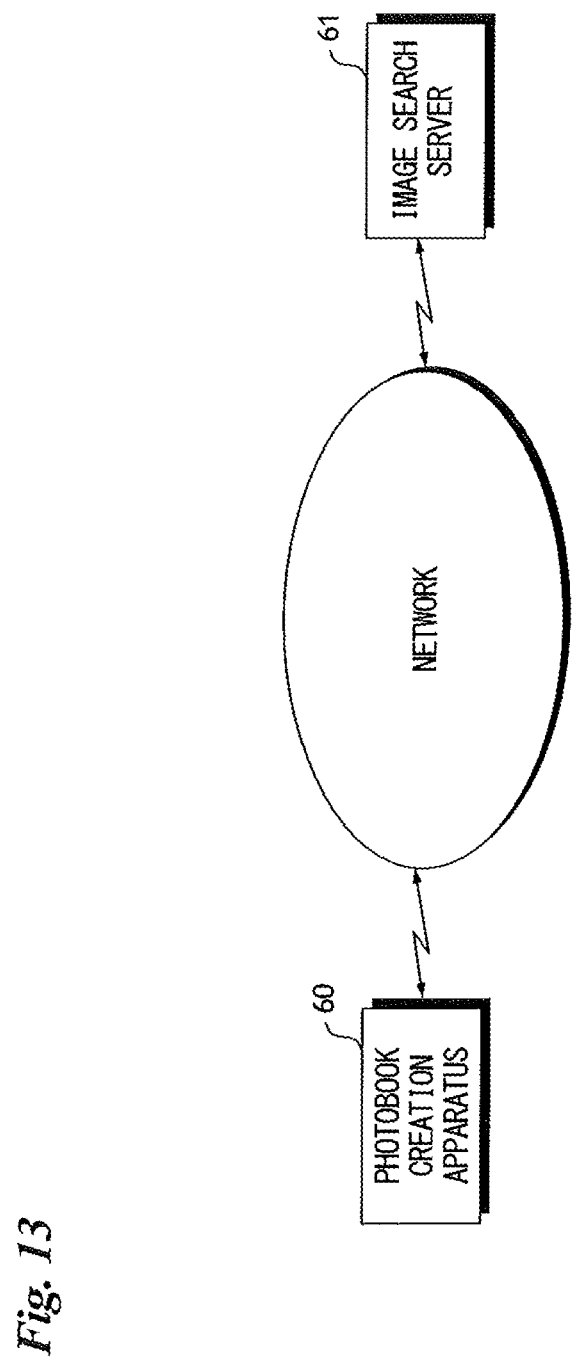
FIG. 13 illustrates the configuration of a photobook creation system.

FIG. 11 is a flowchart illustrating page editing processing (the processing executed at step 33 in FIG. 3). FIG. 12 is an example of an editing image 40A actually displayed on the display screen of the display device 4 of the photobook creation apparatus 1.

The editing image of the group corresponding to an nth page is displayed on the display screen (step 51). The editing image 40A, which corresponds to the above-described virtual editing image 40, includes a candidate area 41A, a layout area 42A and a deletion area 43A. The layout area 42A includes an image 44A of a two-page spread. Images having the top ten high scores are displayed in the two-page spread image 44A. However, the left-side page 45A of the two-page spread image 44A that includes the first page of the photobook does not include any images, and the right-side page 46A of the two-page spread image 44A becomes the first page of the photobook. Therefore, from among the images included in the image list of the group of the nth page, those having the top five high scores are displayed on the right-side page 46A, and those whose scores rank sixth and lower are displayed in the candidate area 41A. Images that are not required to be placed in the electronic album are displayed in the deletion area 43A.

Using the editing image displayed on the display screen, the user changes the images and layout. For example, if an image being displayed in the candidate area 41A or deletion area 43A is moved onto the two-page spread image 44A in the layout area 42A by drag-and-drop ("YES" at step 52), as indicated by arrow 47A in FIG. 12, the characteristics of the moved image are construed to be in line with the preference of the user. When the editing operation is performed, therefore, the weighting coefficients of the feature quantities that correspond to the feature quantities of the moved image are changed (step 53). For example, if the blurriness feature quantity among the feature quantities of the moved image is higher than the average feature quantity, it is understood that blurry images rather than highly sharp images are in line with user preference. The blurriness weighting coefficient, therefore, is raised. For example, the initial value k for the blurriness feature quantity is changed to k1. The weighting coefficient thus changed is stored in the feature quantity weighting coefficient table. A similar operation is performed with regard to the weighting coefficients of the other feature quantities such as brightness and composition.

Further, if an image being displayed in the candidate area 41A or layout area 42A is moved to the deletion area 43A ("YES" at step 54), as indicated by arrow 47B in FIG. 12, the characteristics of the moved image are construed not to be in line with the preference of the user. When such an editing operation is performed, the weighting coefficients of the feature quantities that correspond to the feature quantities of the moved image are lowered (step 55).

Furthermore, if an image being displayed in the layout area 42A is moved to the candidate area 41A ("YES" at step 56), as indicated by arrow 47C in FIG. 12, it is judged that the characteristics of this image were not preferable after all and therefore the weighting coefficients, which had been raised, are restored to their original values (step 57). Further, if an image being displayed in the deletion area 43A is moved to the candidate area 41A ("YES" at step 56), as indicated by arrow 47D in FIG. 12, it is judged that the characteristics of this image were not disliked after all and therefore the weighting coefficients, which had been lowered, are restored to their original values (step 57).

When weighting coefficients are changed by page editing in the manner described above, the images in all of the image lists are scored again utilizing the weighting coefficients that have been changed (step 29 in FIG. 3). The weighting coefficients for an image having feature quantities in line with user preference are changed so as to raise the score of the image, and the weighting coefficients for an image having feature quantities disliked by the user are changed so as to lower the score of the image. Accordingly, since the scores of images in line with user preference are raised, images in line with user preference are laid out in the virtual page 44 of virtual layout area 42.

When a page number n is designated, a page image in which images in line with user preference have been laid out is actually displayed on the display screen, as mentioned above. In this way files representing the electronic album (photobook) are generated and the electronic album is created.

FIGS. 13 to 18 illustrate another embodiment and relate to a photobook creation system constituted by a photobook creation apparatus 60 and an image search server 61 that communicate over a network.

The photobook creation apparatus 60 and image search server 61 are capable of communicating with each other via a network such as the Internet.

The photobook creation apparatus 60 and image search server 61 have a configuration the same as that shown in FIG. 1. Naturally, the image search server 61 would not require such components as the display-related devices and memory card reader 8.

FIGS. 14 to 17 are flowcharts illustrating processing executed by the photobook creation apparatus 60 and image search server 61.

Although all of the above-described processing is executed in the photobook creation apparatus 1, the processing described below is such that page editing is performed in the photobook creation apparatus 1 and layout in the image search server 61.

Figure 14:
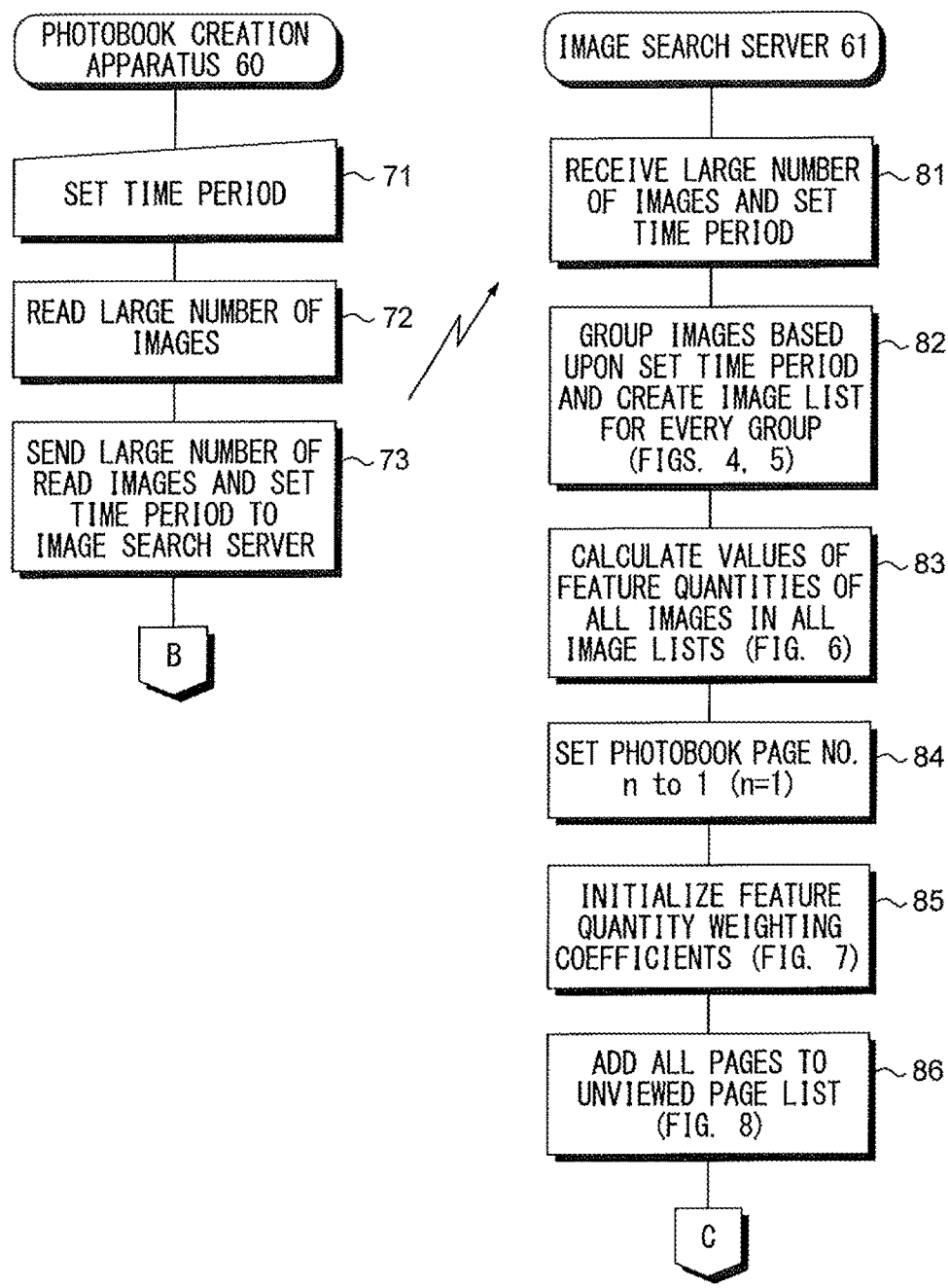
FIGS. 14 to 17 are flowcharts illustrating processing executed by the photobook creation system.

In a manner similar to that described above, the period of image capture is set in the photobook creation apparatus 60 (step 71 in FIG. 14) and image files are read from the memory card 9 loaded in the photobook creation apparatus 60 (step 72 in FIG. 14). The read image files and the data representing the set period of time are sent from the photobook creation apparatus 60 to the image search server 61 (step 73 in FIG. 14). It may be so arranged that only image files representing images within the set time period are sent from the photobook creation apparatus 60 to the image search server 61.

When image files representing a large number of images and data indicating the set time period are received by the image search server 61 (step 81 in FIG. 14), these images are grouped and an image list is created for each group (step 82 in FIG. 14) in a manner similar to that described above. The values of the feature quantities of all images in all of the lists are calculated (step 83 in FIG. 14) and a photobook page number n is set to 1 (step 84 in FIG. 14). The feature quantity weighting coefficients are initialized (step 85) and all pages are added to a list of unviewed pages (step 86 in FIG. 14).

An nth page (first page) is deleted from the unviewed page list (step 87 in FIG. 15) and the images in all image lists are scored utilizing the feature quantity weighting coefficients (step 88). In a manner similar to that described above, images having the top ten high scores in the two-page spread of the unviewed page list are laid out in the virtual layout area 42, and images whose scores rank $11^{th}$ and lower are placed in the virtual candidate area 41 (steps 89, 90 in FIG. 15).

Figure 15:
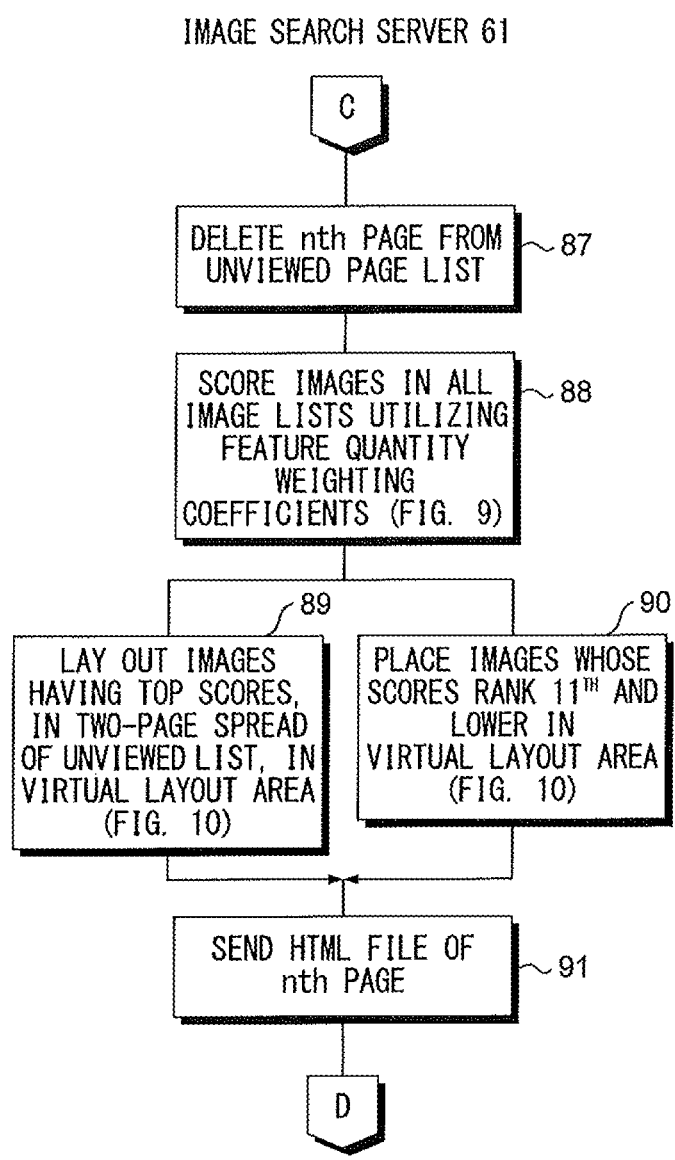

An HTML (HyperText Markup Language) file representing the editing image (see FIG. 12) of the nth page also is generated and the HTML file is sent from the photobook creation apparatus 1 to the photobook creation apparatus 60 (step 91 in FIG. 15).

Figure 17:
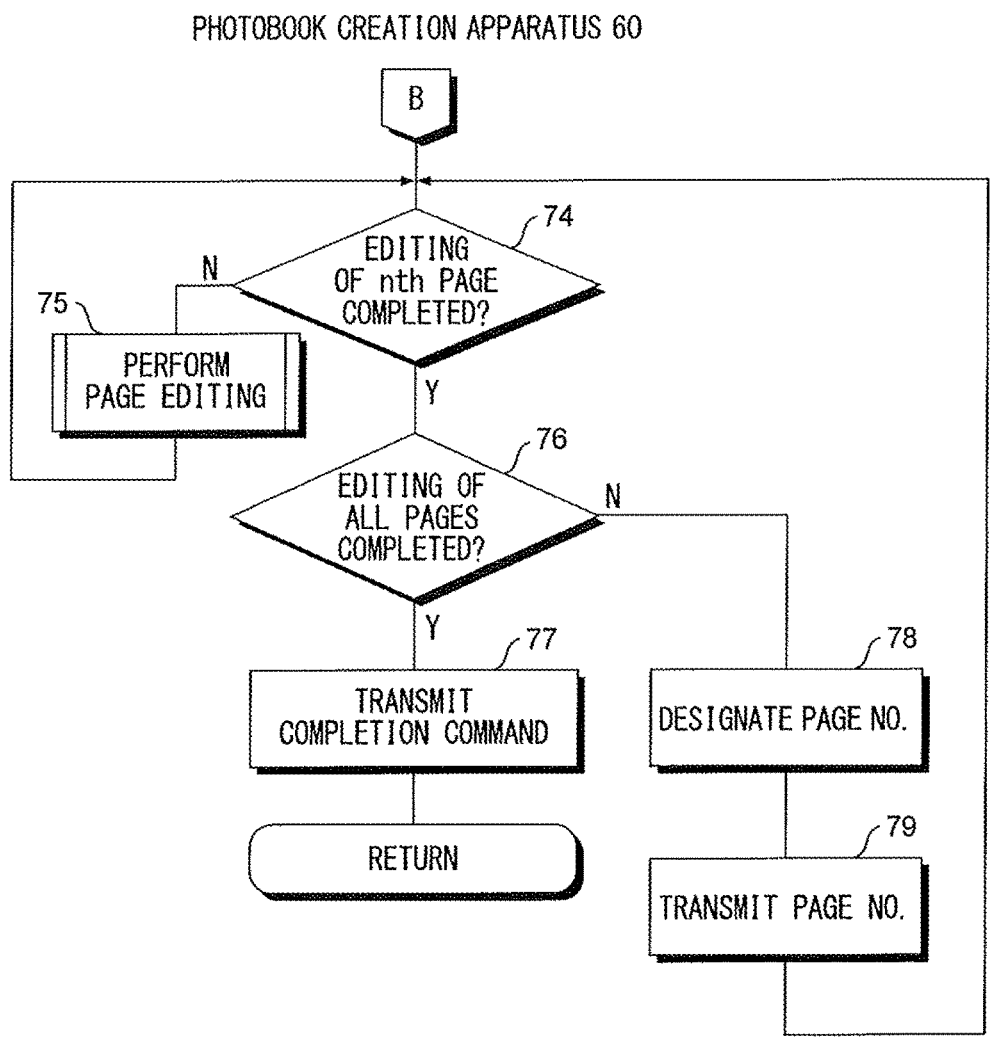

If, when the HTML file sent from the image search server 61 is received by the photobook creation apparatus 60, the editing of the nth page has not been completed ("NO" at step 74 in FIG. 17), page editing is carried out (step 75 in FIG. 17). The details of page editing will be described later. If page editing has not been completed ("NO" at step 76 in FIG. 17), a page number is designated (step 78 in FIG. 17) and data representing the designated page number is sent to the image search server 61 (step 79 in FIG. 17). When editing of all pages is finished ("YES" at step 76 in FIG. 17), a completion command is sent to the image search server 61 (step 77 in FIG. 17).

Figure 18:
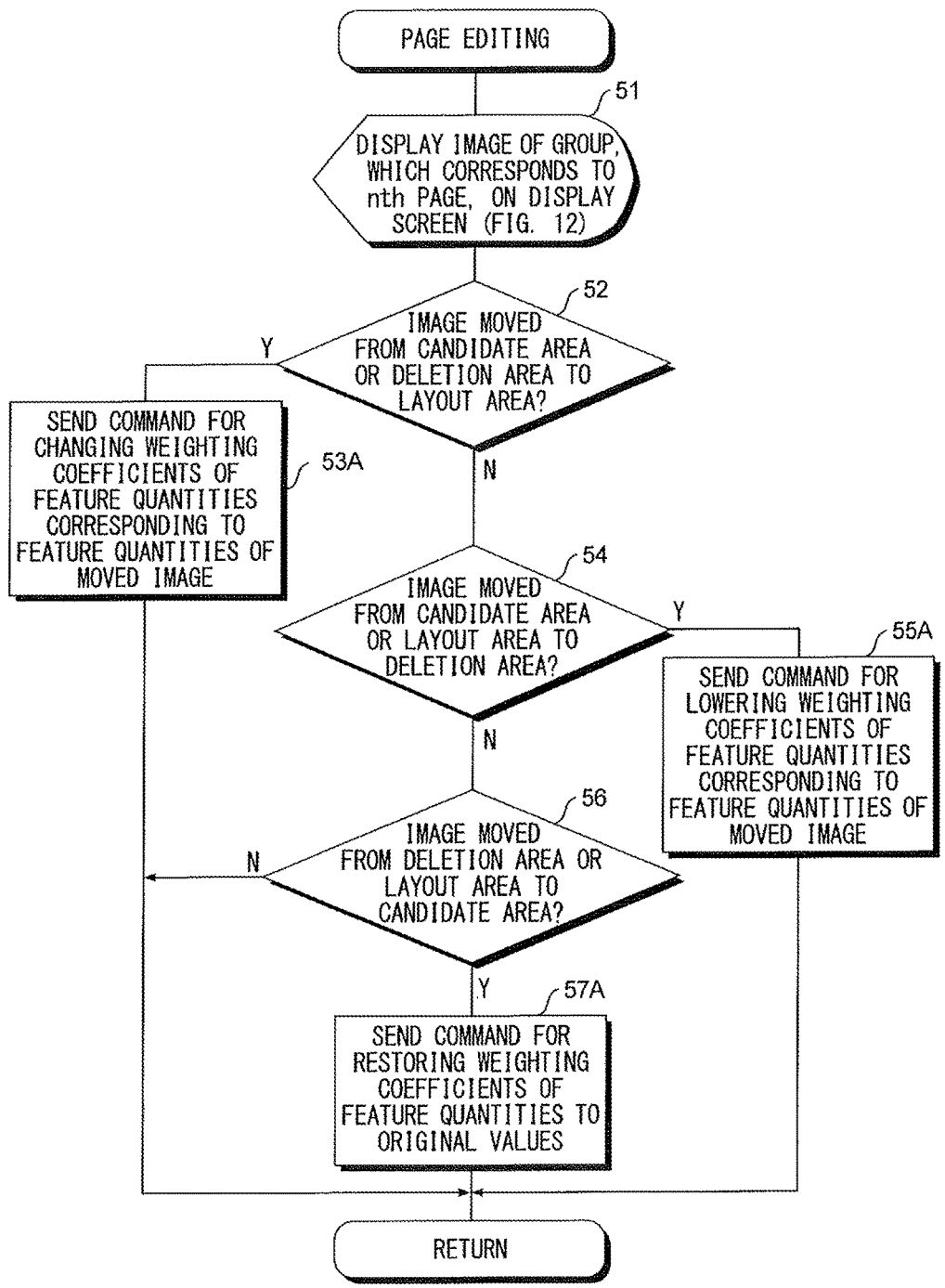
FIG. 18 is a flowchart of page editing processing.

FIG. 18 is an example of a flowchart illustrating page editing processing (the processing executed at step 75 in FIG. 17). Processing steps in FIG. 18 identical with those shown in FIG. 11 are designated by like step numbers.

With reference to FIG. 18, when the HTML file of the nth page sent from the image search server 61 is received by the photobook creation apparatus 60, the editing image 40A is displayed on the display screen of the photobook creation apparatus 60 (step 51 in FIG. 18), as illustrated in FIG. 12.

When an image is moved from the candidate area or deletion area to the layout area ("YES" at step 52), in a manner similar to that set forth above, a command that changes the weighting coefficients of the feature quantities that correspond to the feature quantities of this image is sent to the image search server 61 (step 53A). When an image is moved from the candidate area or layout area to the deletion area ("YES" at step 54), a command that lowers the weighting coefficients of the feature quantities that correspond to the feature quantities of this moved image is sent to the image search server 61 (step 55A). When an image is moved from the deletion area or layout area to the candidate area ("YES" at step 56), a command that restores the changed weighting coefficients to the original weighting coefficients is sent to the image search server 61 (step 57A).

Figure 16:
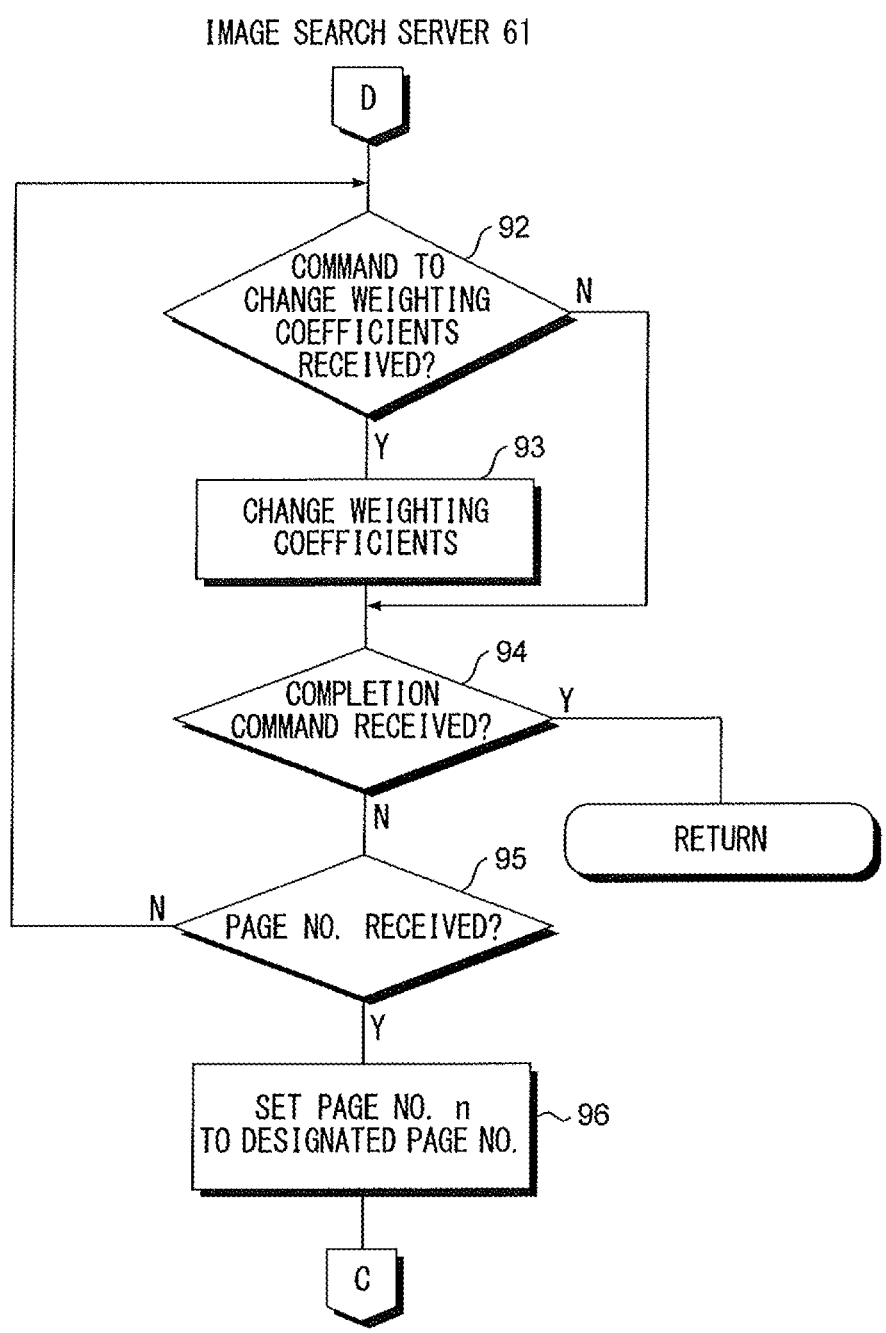

With reference to FIG. 16, when a command to change weighting coefficients is received by the image search server 61 ("YES" at step 92), the weighting coefficients are changed in accordance with this command (step 93). If a completion command is not received ("NO" at step 94), the image search server 61 checks to determine whether or not data representing page number n has been received (step 95). When data representing page number n is received ("YES" at step 95), page number n is set to a designated page number (step 96). Subsequent processing is similar to that described above.

In the foregoing embodiment, it may be arranged so that a trash can (area) for unwanted persons is provided on the display screen. If an image containing a person from among images being displayed on the display screen is moved to such a trash can for unwanted persons, the result will be a layout in which this person is not included in the photobook. In order to achieve this, the feature quantities indicative of the likenesses of individual persons are detected for every image, and the feature quantities indicative of the likenesses of these individuals (the feature quantities of Mr. A, the feature quantities of Mr. B and the feature quantities of Mr. C and so forth) are stored in the feature quantity table shown in FIG. 6. A person contained in an image that has been moved to the trash can for unwanted persons is specified. By enlarging, in the negative direction, the weighting coefficients applied to the feature quantities of this specified person, the image of the person contained in the image that has been moved to the trash can for unwanted persons will not be laid out.

Of course, a trash can for unwanted persons need not be provided anew. If the feature quantities of every person are entered beforehand in the feature quantity table shown in FIG. 6, then, by moving an image containing an unwanted person to the above-described deletion area, there will be no rise in the score of the image containing this unwanted person. As a result, the image containing the unwanted person can be prevented from being laid out.

FIGS. 19 to 23 illustrate a further embodiment, which is for the purpose of finding the image of a desired commercial product. In the system configuration shown in FIG. 13, a client computer is utilized instead of the photobook creation apparatus 60. The configuration of the client computer is the same as that shown in FIG. 1.

FIGS. 19 to 22 are flowcharts illustrating processing executed by the client computer and image search server 61.

The client computer is connected to the Internet and accesses a desired shopping site. If a first keyword ("clock", for instance) is input to the client computer (step 101 in FIG. 19), data representing the entered first keyword is sent to the image search server 61 (a server for the shopping site) (step 102).

Figure 19:
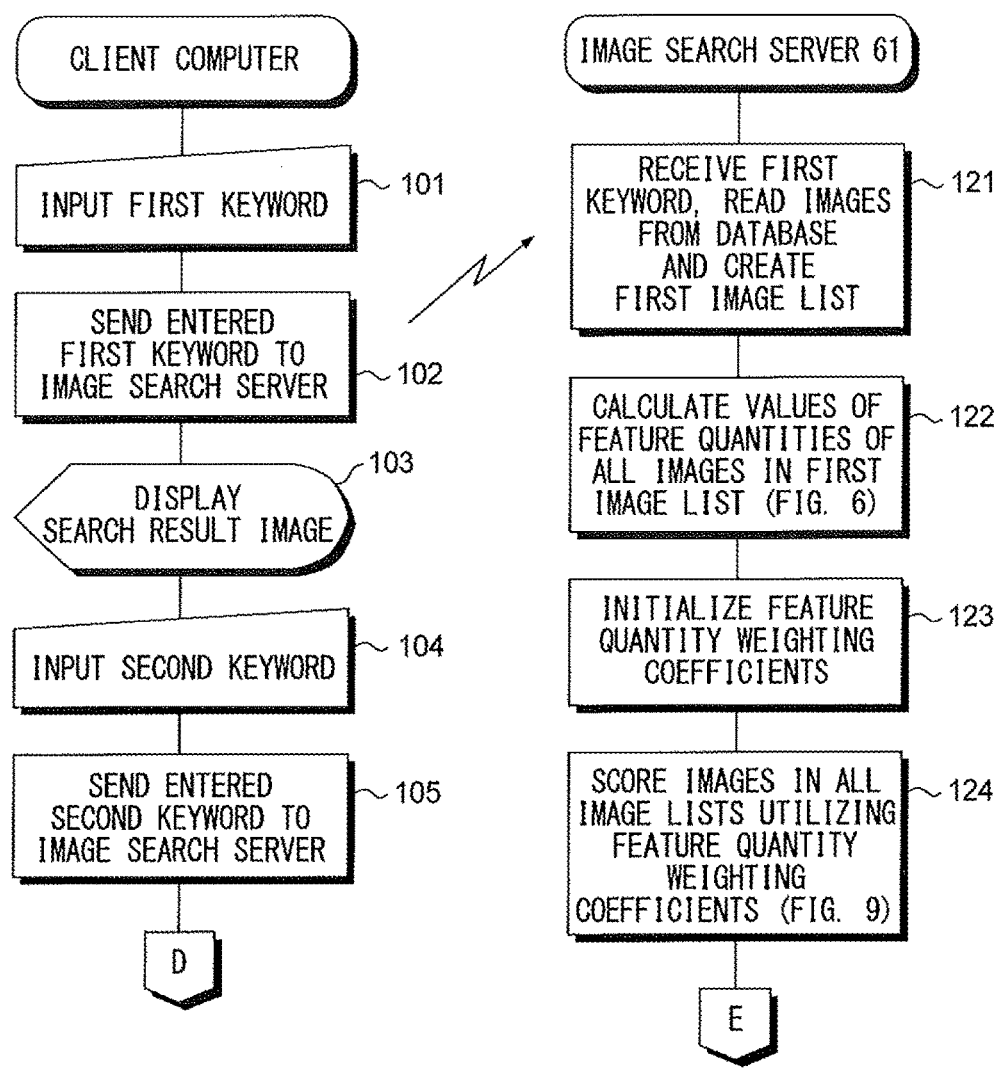
FIGS. 19 to 22 are flowcharts illustrating processing executed by a client computer and image search server.

When the data representing the first keyword is received by the image search server 61, images corresponding to the first keyword are read from an image database and a first image list is created (step 121 in FIG. 19). The values of feature quantities of all images in the created first image list are calculated in the manner described above (see FIG. 6). Further, the feature quantity weighting coefficients are initialized (step 123 in FIG. 19). The images in the image list are scored utilizing the feature quantity weighting coefficients (step 124 in FIG. 19).

Figure 21:
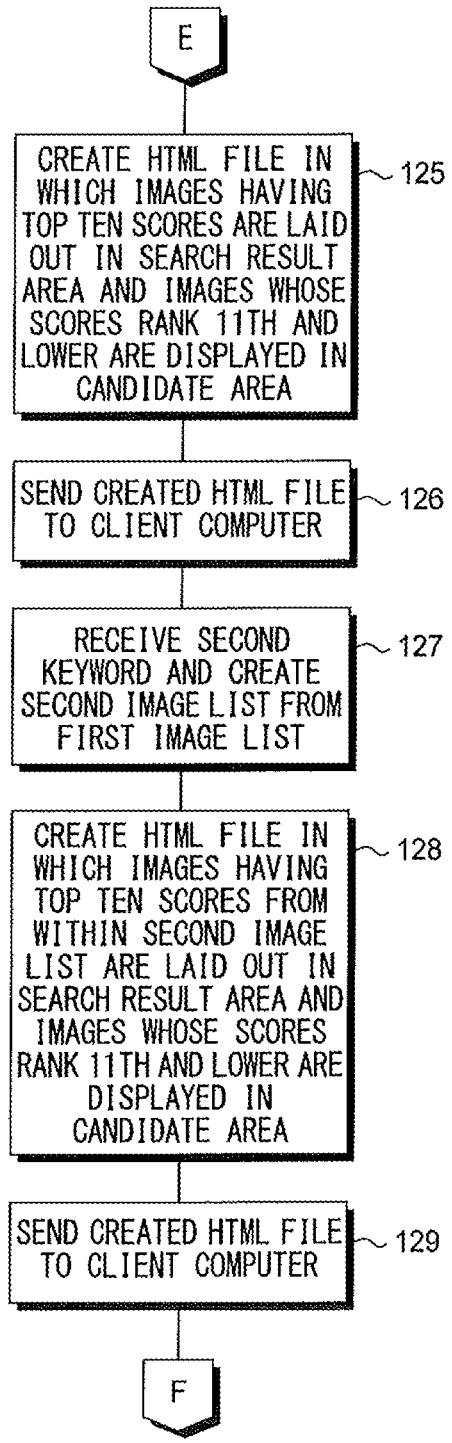

An HTML file representing an HTML page in which images having the top ten scores will be laid out in a search result display area and images whose scores rank $11^{th}$ and lower will be placed in a candidate area is created (step 125 in FIG. 21). The HTML file created is sent from the image search server 61 to the client computer (step 126 in FIG. 21).

When the HTML file sent from the image search server 61 is received by the client computer, the search result image represented by this HTML file is displayed on the display screen of the display device of the client computer (step 103 in FIG. 19). Next, a second keyword ("analog wristwatch", for instance) is input to the client computer and data representing the entered second keyword is sent from the client computer to the image search server 61 (step 105 in FIG. 19).

When the data representing the second keyword sent from the client computer is received by the image search server 61, images that match the second keyword are selected from within the first image list and a second image list is created (step 127 in FIG. 21). An HTML file in which images having the top ten scores from among the created second image list will be laid out in the search result area and images whose scores rank $11^{th}$ and lower will be placed in the candidate area is created (step 128 in FIG. 21). The HTML file created is sent from the image search server 61 to the client computer (step 129 in FIG. 21).

Figure 20:
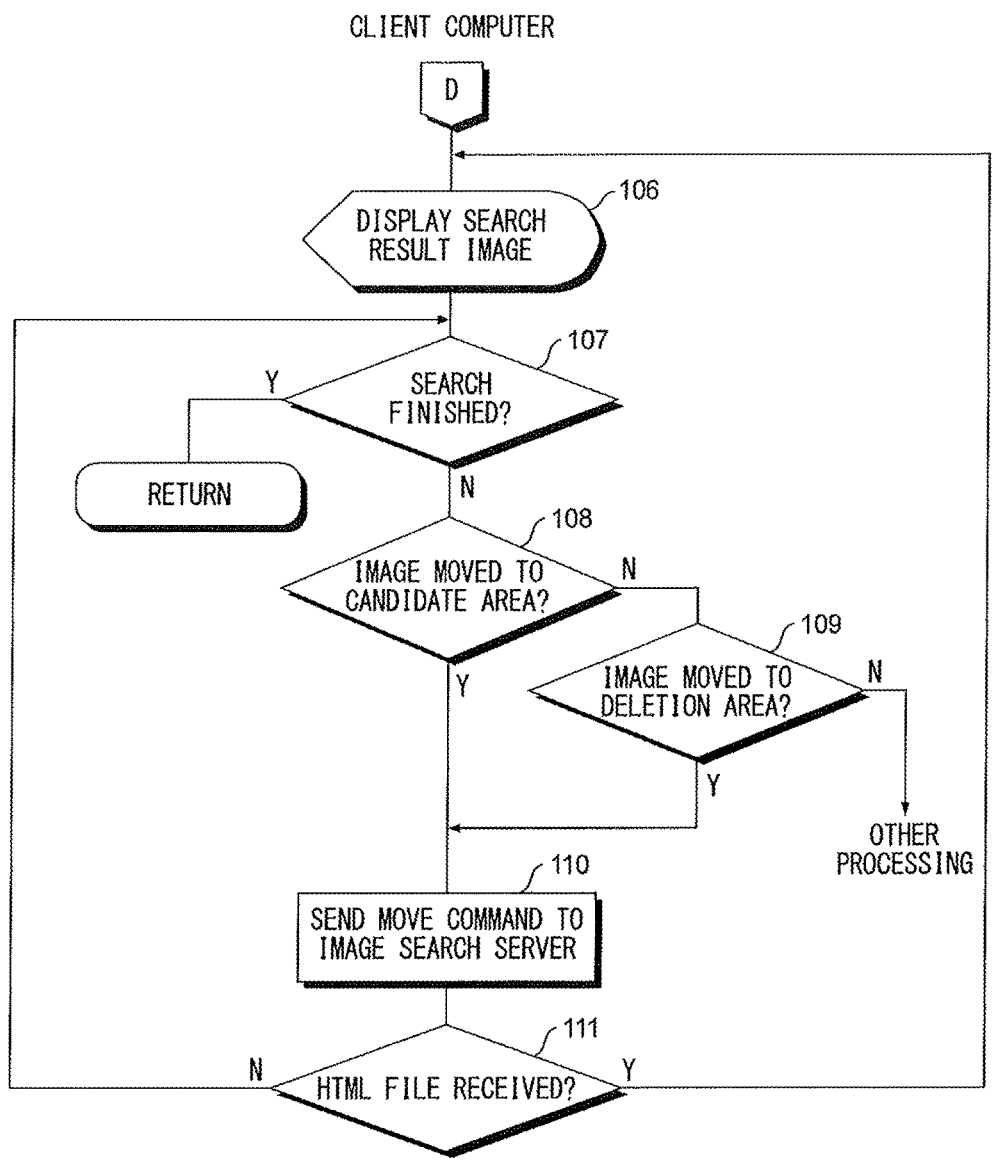

When the HTML file sent from the image search server 61 is received by the client computer, the search result image represented by this HTML file is displayed on the display screen of the display device of the client computer (step 106 in FIG. 20).

Figure 23:
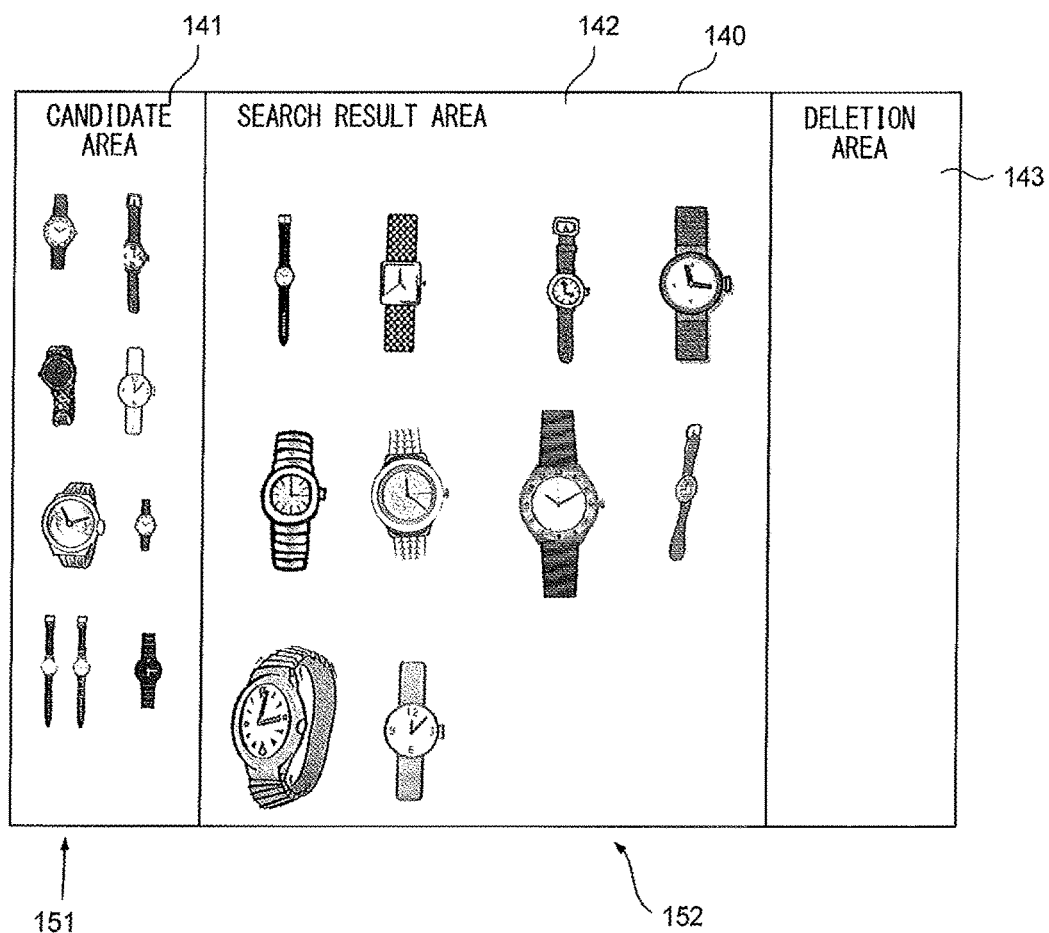
FIG. 23 is an example of a search result image.

FIG. 23 is an example of a search result image 140.

The search result image 140 includes a candidate area 141, a search result area 142 and a deletion area 143. Commercial product images 152 having the top ten scores are displayed in the search result area 142, as mentioned above. Commercial product images 151 whose scores rank $11^{th}$ and lower are displayed in the candidate area 141. If the search is not finished ("NO" at step 107 in FIG. 20), then it is determined whether an image 150 being displayed in the search result area 142 has been moved to the candidate area 141 (step 108 in FIG. 20) and, if not, whether the image 150 being displayed in the search result area 142 has been moved to the deletion area 143 (step 109 in FIG. 20). If either movement is determined to have occurred, then a move command representing the content of this movement is sent from the client computer to the image search server 61 (step 110 in FIG. 20). If an HTML file representing the search result image sent from the image search server 61 is received by the client computer, the search result image is displayed again; otherwise, control returns to the processing of step 107 (step 111 in FIG. 20).

Figure 22:
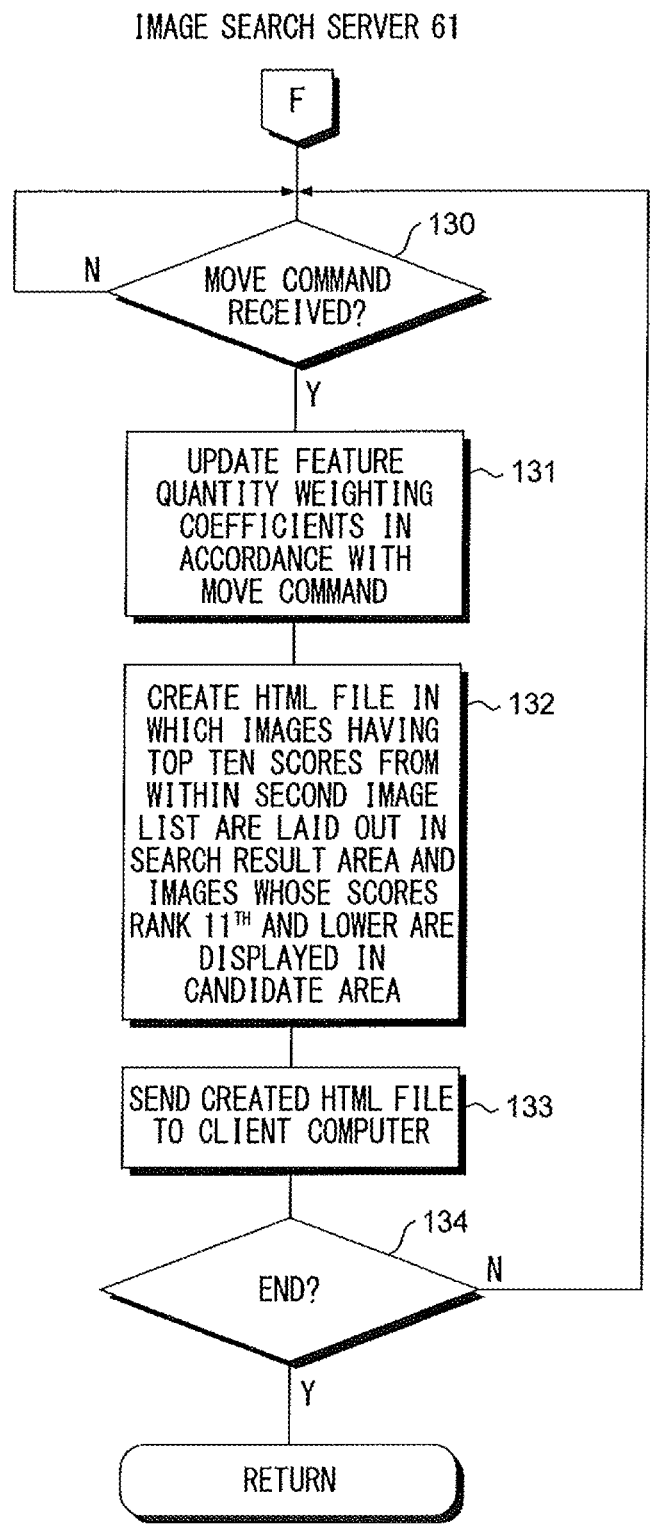

When the move command sent from the client computer is received by the image search server 61 ("YES" at step 130 in FIG. 22) the weighting coefficients of the feature quantities are updated in response to the move command (step 131 in FIG. 22). For example, in a case where the image 150 being displayed in the search result area 142 has been moved to the candidate area 141, it is construed that the moved image 150 closely resembles the desired product. As a consequence, the weighting coefficients corresponding to the feature quantities of the moved image 150 rise in value. In a case where the image 150 being displayed in the search result area 142 has been moved to the deletion area 143, it is construed that the moved image 150 does not resemble the desired product. As a consequence, the weighting coefficients corresponding to the feature quantities of the moved image 150 decline in value.

In this way the weighting coefficients are updated and the images in the second image list are scored. An HTML file in which images having the top ten scores will be laid out in the search result area 142 and images whose scores rank $11^{th}$ and lower will be displayed in the candidate area 141 is created (step 132 in FIG. 22). The HTML file created is sent to the client computer (step 133 in FIG. 22) and the desired product image can be found at the client computer. If this is not the end of the processing of this flowchart ("NO" at step 134 in FIG. 22), processing from step 130 onward is repeated.

As many apparently widely different embodiments of the present invention can be made without departing from the spirit and scope thereof, it is to be understood that the invention is not limited to the specific embodiments thereof except as defined in the appended claims.

What is claimed is:

1. An image search server constituting an image search system having a client computer and the image search server, comprising:
    at least one hardware processor configured to
    calculate, with regard to each image of a multiplicity of images, the values of feature quantities representing characteristics of the image,
    score the image based upon the calculated values of the feature quantities, and
    responsive to application of a first move command which moves one image among a plurality of images displayed in a candidate area, which has been formed on a display screen of said client computer, to a search result area, raise the value of feature quantities, which correspond to the feature quantities of the one image for which the first move command has been applied, and score said multiplicity of images based upon the raised values of the feature quantities.

2. The image search server according to claim 1,
    responsive to application of a second move command which moves one image among a plurality of images being displayed in the candidate area, which has been formed on the display screen of said client computer, or one image among a plurality of images being displayed in the search result area, to a deletion area, lowers the value of feature quantities, which correspond to the feature quantities of the image for which the second move command has been applied, and scores said multiplicity of images with the exception of said plurality of images based upon the lowered values of feature quantities.

3. The image search server according to claim 2,
    at least one hardware processor, in response to application of a third move command which moves an image, which is being displayed in the search result area in accordance with the second move command, to the candidate area, scores the images upon restoring lowered values of the feature quantities to original values.

4. The image search server according to claim 1,
    at least one hardware processor, in response to application of a third move command which moves an image, which is being displayed in the search result area in accordance with the first move command, to the candidate area, scores the images upon restoring raised values of the feature quantities to original values.

5. A method of controlling operation of an image search server constituting an image search system having a client computer and the image search server, comprising steps of:
    calculating, with regard to each image of a multiplicity of images, the values of feature quantities representing characteristics of the image;
    scoring the image based upon the calculated values of the feature quantities; and
    in response to application of a first move command which moves one image among a plurality of images being displayed in a candidate area, which has been formed on a display screen of the client computer, to a search result area, raising the value of feature quantities, which correspond to the feature quantities of the one image for which the first move command has been applied, and scoring said multiplicity of images based upon the raised values of the feature quantities.

6. An image search apparatus comprising:
    at least one hardware processor configured to
    control a display unit to display a plurality of images in a candidate area of a display screen,
    calculate, with regard to each image of a multiplicity of images, the values of feature quantities representing characteristics of the image,
    score the image based upon the calculated values of the feature quantities, and
    responsive to application of a first move command which moves one image among a plurality of images displayed in a candidate area, which has been formed on a display screen, to the search result area, raise the value of feature quantities, which correspond to the feature quantities of the one image for which the first move command has been applied, and score said multiplicity of images based upon the raised values of the feature quantities.

7. The image search apparatus according to claim 6,
    responsive to application of a second move command which moves one image among a plurality of images being displayed in the candidate area, which has been formed on the display screen of said client computer, or one image among a plurality of images being displayed in the search result area, to a deletion area, lowers the value of feature quantities, which correspond to the feature quantities of the image for which the second move command has been applied, and scores said multiplicity of images with the exception of said plurality of images based upon the lowered values of feature quantities.

8. The image search apparatus according to claim 7,
    at least one hardware processor, in response to application of a third move command which moves an image, which is being displayed in the search result area in accordance with the second move command, to the candidate area, scores the images upon restoring lowered values of the feature quantities to original values.

9. The image search apparatus according to claim 6,
    at least one hardware processor, in response to application of a third move command which moves an image, which is being displayed in the search result area in accordance with the first move command, to the candidate area, scores the images upon restoring raised values of the feature quantities to original values.

10. A method of controlling operation of an image search apparatus, comprising steps of:
controlling a display unit so as to display a plurality of images in a candidate area of a display screen;
calculating, with regard to each image of a multiplicity of images, the values of feature quantities representing characteristics of the image;
scoring the image based upon the calculated values of the feature quantities; and
in response to application of a first move command which moves one image among a plurality of images being displayed in a candidate area, which has been formed on the display screen, to a search result area, raising the value of feature quantities, which correspond to the feature quantities of the one image for which the first move command has been applied, and scoring said multiplicity of images based upon the raised values of the feature quantities.

* * * * *